UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

RESINOUS CONDENSATION PRODUCTS AND PROCESS OF MAKING THE SAME.

1,098,777.   Specification of Letters Patent.   Patented June 2, 1914.

No Drawing.   Application filed July 25, 1913. Serial No. 781,111.

*To all whom it may concern:*

Be it known that I, WILLIAM C. ARSEM, a citizen of the United States, residing at Schenectady, in the county of Schenectady, State of New York, have invented certain new and useful Improvements in Resinous Condensation Products and the Process of Making the Same, of which the following is a specification.

This application is a continuation in part of my application filed September 12, 1912, Serial No. 719,994.

The present invention relates to synthetic resinous compositions which may be rendered insoluble and infusible, and which are suitable for the production of molded articles, electrical insulation, varnishes, etc.

Glycerol, and other polyhydric alcohols, combine with various polybasic acids at an elevated temperature to form resins. These resins apparently are esters of complex molecular structure. Two or more molecules of organic base or alcohol may combine with two or more molecules of acid, the molecular structure probably varying with the proportions and the conditions. Unless special precautions are taken, it is likely that a mixture of various esters such as mono, di, or tri-acid esters, neutral esters, and perhaps other compounds are formed during the reaction.

In accordance with my present invention esters are formed from a polyhydric alcohol and a polybasic acid in such proportions that free or unesterified hydroxyl groups remain, and such esters are then combined with oleic acid to complete the esterification, thus producing mixed esters of fairly definite composition having properties which render them especially valuable for electrical insulations.

An ester of a polyhydric alcohol, as, for example, glycerol, and a polybasic acid, as, for example, phthalic acid, or its anhydrid, is first prepared, these two ingredients being used in such proportions that unesterified hydroxyl groups remain.

As has already been indicated, 1½ gram-molecules of phthalic anhydrid will combine with 1 gram-molecule of glycerin. In the preparation of the preferred form of resin ¼ gram-molecule of phthalic anhydrid is replaced by oleic acid. Oleic acid being a monobasic acid ½ gram-molecule of the same is required to replace ¼ gram-molecule of the dibasic phthalic anhydrid. Instead of combining with the glycerin all of the phthalic anhydrid to be added, I prefer to combine 1 gram-molecule of glycerin with 1 gram-molecule of phthalic anhydrid and then to add the rest of the phthalic anhydrid with the oleic acid. For example, 92 parts of glycerin are mixed with 148 parts by weight of phthalic anhydrid. These materials are gently heated, the temperature being gradually increased to 200° C. At this temperature reaction takes place with the evolution of gas and the mass should be kept at a temperature of about 200 to 210° C. until evolution of gases tends to decrease, care being taken to prevent undue rise of temperature. The reaction should be stopped before the mass becomes viscous and puffy which is an indication that the reaction has proceeded too far.

The mixture of oleic acid and phthalic anhydrid is then added to completely esterify the remaining uncombined hydroxyl groups of the mono-acid ester. In the present example, this will require a mixture by weight with 141 parts of oleic acid and 37 parts of phthalic anhydrid. An excess of oleic acid is not recommended when the material it to be used for electrical insulating purposes, but in some cases may be advantageous as it tends to make the product more flexible. When the oleic acid mixture is first added it forms an immiscible layer with the saturated resin but after heating from 200 to 215° C. reaction occurs. The material becomes a deep red color and the temperature may then be raised from 220 to 230° C. At this temperature the reaction is accompanied with considerable frothing. About 1½ hours are required for the preparation of the resin up to this point.

The resinous condensation product thus produced is a thick reddish liquid which congeals at room temperature and is soluble in various organic solvents such as benzol, naphtha, turpentine, coal tar oil, and the like. The material may be made insoluble and infusible by continued heating about twenty to thirty hours at a temperature of about 160° C., but remains flexible. The flexibility may be varied by varying the proportions of the phthalic and oleic acids. Decreasing the amount of oleic acid decreases the flexibility of the resin.

The resin in its final hardened state is not attacked by weak acids or chlorin. It withstands long continued heating at about 150° C., without marked change in physical properties. In thin layers the resin is transparent both in the fusible and infusible states.

Either the liquefied resin itself or its solution may be used as an impregnating material for fabrics, paper, wood or the like in the electrical arts or it may be used as a varnish to be applied directly on metal surfaces for insulating or other industrial purposes. In some cases when the material is to be used for impregnating purposes it is desirable to first partially harden it by heating to a temperature of about 150 to 160° C. for some length of time up to about 15 hours, which removes uncombined constituents and eliminates water. The material thus treated may then be dissolved or otherwise utilized. The hardening is completed by heating the varnished surface after evaporation of the solvent. The resinous material may also be used in the production of molded compounds and for this purpose may be mixed either in the liquid or dissolved state or as a dry powder with a filler such as asbestos, clay, ground slate, silica, and the like, and molded under pressure, or it may be molded without any inert admixture, part at least of the material being in the state of a powder.

The change in physical properties due to the hardening heat treatment is not entirely understood but is probably due to a polymerization or alteration in molecular structure.

What I claim as new and desire to secure by Letters Patent of the United States, is:

1. A composition of matter, comprising a fusible, soluble resinous compound of a polyhydric alcohol, a polybasic acid, and oleic acid.

2. A composition of matter, comprising a fusible resinous glycerol ester of phthalic acid and oleic acid, soluble in organic solvents, and convertible by heating to an insoluble, infusible state.

3. A flexible, fusible, soluble resinous product of a polyhydric alcohol, phthalic anhydrid, and oleic acid, said material being convertible by heating to an insoluble, infusible state, while retaining flexibility.

4. The process which consists in heating a mixture of glycerol and phthalic anhydrid in about equal molecular proportions by weight until combination takes place, then adding one-fourth molecular proportion of phthalic anhydrid and one-half molecular proportion of oleic acid by weight, and completing the reaction to form a fusible, soluble resin.

In witness whereof, I have hereunto set my hand this 24th day of July, 1913.

WILLIAM C. ARSEM.

Witnesses:
BENJAMIN B. HULL,
HELEN ORFORD.